US 8,209,665 B2

(12) United States Patent
Rama et al.

(10) Patent No.: US 8,209,665 B2
(45) Date of Patent: Jun. 26, 2012

(54) IDENTIFICATION OF TOPICS IN SOURCE CODE

(75) Inventors: Girish Maskeri Rama, Bangalore (IN); Kenneth Heafield, Pittsburgh, PA (US); Santonu Sarkar, Bangalore (IN)

(73) Assignee: Infosys Limited, Bangalore (IN)

( * ) Notice: Subject to any disclaimer, the term of this patent is extended or adjusted under 35 U.S.C. 154(b) by 941 days.

(21) Appl. No.: 12/212,534

(22) Filed: Sep. 17, 2008

(65) Prior Publication Data

US 2009/0254884 A1 Oct. 8, 2009

(51) Int. Cl.
*G06F 9/44* (2006.01)

(52) U.S. Cl. ........ 717/122; 717/107; 717/108; 717/115; 717/116; 717/121

(58) Field of Classification Search ........................ None
See application file for complete search history.

(56) References Cited

U.S. PATENT DOCUMENTS 5,524,244 A * 6/1996 Robinson et al. ............. 717/140
2008/0005693 A1* 1/2008 Oliver et al. .................. 715/781

OTHER PUBLICATIONS

Source navigator 5.1.4., "Introduction," <http://sourcenav.sourceforge.net>, 3 pages (accessed Sep. 15, 2008).
Source navigator 5.1.4., "Source-Navigator Tutorial," <http://sourcenav.sourceforge.net>, 17 pages. (accessed Sep. 15, 2008).
Anderson and Zarins, "The codesurfer software understanding platform." In IWPC, pp. 147-148, IEEE Computer Society, 2005.
Anquetil and Lethbridge, "Recovering software architecture from the names of source files," Journal of Software Maintenance: Research and Practice, 11:201-221, 1999.
Antoniol, Canfora, Casazza, Lucia, and Merlo, "Recovering traceability links between code and documentation," IEEE Transactions in Software Engineering, 28(10):970-983, 2002.
Biggerstaff, Mitbander, and Webster, "Program understanding and the concept assignment problem," Communications of the ACM, 37(5):72-83, May 1994.
Bin, David, and Xinghua, "Identifying biological concepts from a protein-related corpus with a probabilistic topic model," BMC Bioinformatics, 7, 2006.
Blei, Ng, and Jordan, "Latent dirichlet allocation," Journal of Machine Learning Research, 3:993-1022, 2003.
Caprile and Tonella. "Nomen est omen: Analyzing the language of function identifiers," In Proceedings of the Sixth Working Conference on Reverse Engineering, 1999.
Deerwester, Dumais, Furnas, and Landauer, "Indexing by latent semantic analysis," Journal of the American Society for Information Science, 41:391-407, 1990.
Griffiths and Steyvers. "Finding scientific topics," In Proceedings of the National Academy of Sciences, pp. 5228-5235, 2004.

(Continued)

*Primary Examiner* — Chuck Kendall
(74) *Attorney, Agent, or Firm* — Klarquist Sparkman, LLP

(57) ABSTRACT

Topics in source code can be identified using Latent Dirichlet Allocation (LDA) by receiving source code, identifying domain specific keywords from the source code, generating a keyword matrix, processing the keyword matrix and the source code using LDA, and outputting a list of topics. The list of topics is output as collections of domain specific keywords. Probabilities of domain specific keywords belonging to their respective topics can also be output. The keyword matrix comprises weighted sums of occurrences of domain specific keywords in the source code.

20 Claims, 5 Drawing Sheets

OTHER PUBLICATIONS

Kawaguchi, Garg, Matsushita, and Inoue, "MUDABlue: An automatic categorization system for open source repositories," In APSEC, pp. 184-193, IEEE Computer Society, 2004.

Kuhn, "Semantic clustering: Making use of linguistic information to reveal concepts in source code," Master's thesis, University of Bern, 2006.

Kuhn, Ducasse, and Girba, "Semantic clustering: Identifying topics in source code," Information and Software Technology, v.49 No. 3, p. 230-243, Mar. 2007.

Lafferty and Minka, "Expectation-propagation for the generative aspect model," In Proceedings of the 18th Conference on Uncertainty in Artificial Intelligence, 2002.

Marcus and Maletic, "Identification of high-level concept clones in source code," In Proceedings of the 16th International Conference on Automated Software Engineering (ASE 2001), pp. 107-114, Nov. 2001.

Marcus and Maletic, "Recovering documentation-to-source-code traceability links using latent semantic indexing," In International Conference on Software Engineering, pp. 125-134, IEEE Computer Society Press, May 2003.

Marcus, Sergeyev, Rajlich, and Maletic, "An information retrieval approach to concept location in source code," In Proceedings of the 11th Working Conference on Reverse Engineering (WCRE 2004), pp. 214-223, Nov. 2004.

Maskeri et al., "Mining Business Topics in Source Code using Latent Dirichlet Allocation," India Software Engineering Conference (ISEC) 2008, Feb. 19-21, 2008, 8 pages.

McCallum, Corrada-Emmanuel, and Wang, "Topic and role discovery in social networks," In L. P. Kaelbling and A. Saffiotti, editors, IJCAI, pp. 786-791, Professional Book Center, 2005.

Newman, Chemudugunta, Smyth, and Steyvers, "Analyzing entities and topics in news articles using statistical topic models," In Lecture Notes on Computer Science, Springer-Verlag, 2006.

Porter, "An algorithm for suffix stripping" <http://telemat.det.unifi.it/book/2001/wchange/download/stem_porter.html>, Originally published in Program, 14 No. 3, pp. 130-137 (Jul. 1980).

Poshyvanyk and Marcus, "Combining formal concept analysis with information retrieval for concept location in source code," In ICPC, pp. 37-48, IEEE Computer Society, 2007.

Steyvers, Smyth, Rosen-Zvi, and Griffiths, "Probabilistic author-topic models for information discovery," In W. Kim, R. Kohavi, J. Gehrke, and W. DuMouchel, editors, KDD, pp. 306-315. ACM, 2004.

Ugurel, Krovetz, Giles, Pennock, Glover, and Zha, "What's the code? automatic classification of source code archives," In Proceedings of the eighth ACM SIGKDD international conference on Knowledge discovery and data mining, pp. 632-638, 2002.

Wilde, Buckellew, Page, Rajlich, and Pounds, "A comparison of methods for locating features in legacy software," Journal of Systems and Software, 65(2):105-114, 2003.

Zhao, Zhang, Liu, Sun, and Yang, "Sniafl: Towards a static noninteractive approach to feature location," ACM Transactions on Software Engineering and Methodology, 15(2):195-226, Apr. 2006.

* cited by examiner

IDENTIFICATION OF TOPICS IN SOURCE CODE

BACKGROUND

Software systems are becoming increasingly complex and therefore increasingly cumbersome to understand and maintain. Typically, a software system, such as a large business software system, has millions of lines of source code. Such software systems may have little or no documentation. As a result, adding new features or fixing bugs in such software systems can be very difficult and time consuming.

If the software system is small, the functional architecture may be comprehended by manually browsing the source code. For large software systems, however, people often rely on program analysis techniques. The program analysis techniques may include a call graph method or a control, data flow, and slicing method. Though such program analysis techniques can be helpful in understanding the structural intricacies of the system, they provide little help with understanding the functional intent of the system.

Therefore, there exists ample opportunity for improvement in technologies related to identifying topics in source code.

SUMMARY

An important step in comprehending the functional intent of a software system (or the intended functional architecture) is to identify the topics that exist in the software, around which the high level components (or modules) have been implemented. For example consider a large banking application that deals with customers, bank accounts, credit cards, interest and so on. A maintainer without any application knowledge will find it difficult to add a new interest calculation function. However, if it is possible to extract business topics such as "customer" and "interest" from the source code, and establish an association between "customer" and "interest" and various program elements, it would be of immense help to the maintainer. For example, it could allow the maintainer to identify the related functions, files, classes and data structures and carry out the required changes for adding a new interest calculation function. This in turn can make a novice programmer much more productive in maintaining a system, especially when the software is in the order of millions of lines of code with little documentation.

A variety of technologies related to identifying topics in source code can be applied. For example, identifying topics in source code using Latent Dirichlet Allocation (LDA) can comprise receiving source code, identifying domain specific keywords from the source code, generating a keyword matrix, processing the keyword matrix and the source code using LDA, and outputting collections of domain specific keywords, where the collections correspond to topics. The keyword matrix can comprise weighted sums of occurrences of domain specific keywords in the source code. The output can also comprise probabilities for the domain specific keywords in the collections.

Identifying domain specific keywords from the source code can comprise extracting source code identifiers, splitting the source code identifiers to produce potential domain specific keywords, and filtering the potential domain specific keywords. Optionally, stemming can be performed on the potential domain specific keywords. Filtering is used to remove potential domain specific keywords that are not likely to indicate a topic.

Identifying topics in source code using Latent Dirichlet Allocation (LDA) can also comprise receiving a source code file, identifying a domain specific keyword from the source code (e.g., by splitting a source code identifier), generating a file-keyword matrix, processing the file-keyword matrix and the source code file using LDA, and outputting a collection of domain specific keywords. The file-keyword matrix can comprise a weighted sum of occurrence of the identified domain specific keyword in the source code file. The output collection of domain specific keywords corresponds to a topic identified by LDA in the source code file. The output can also comprise a probability of the identified domain specific keyword being associated with the topic.

The foregoing and other features and advantages will become more apparent from the following detailed description, which proceeds with reference to the accompanying figures.

DETAILED DESCRIPTION OF EXEMPLARY EMBODIMENTS

Example 1

Exemplary Overview

Figure 1:
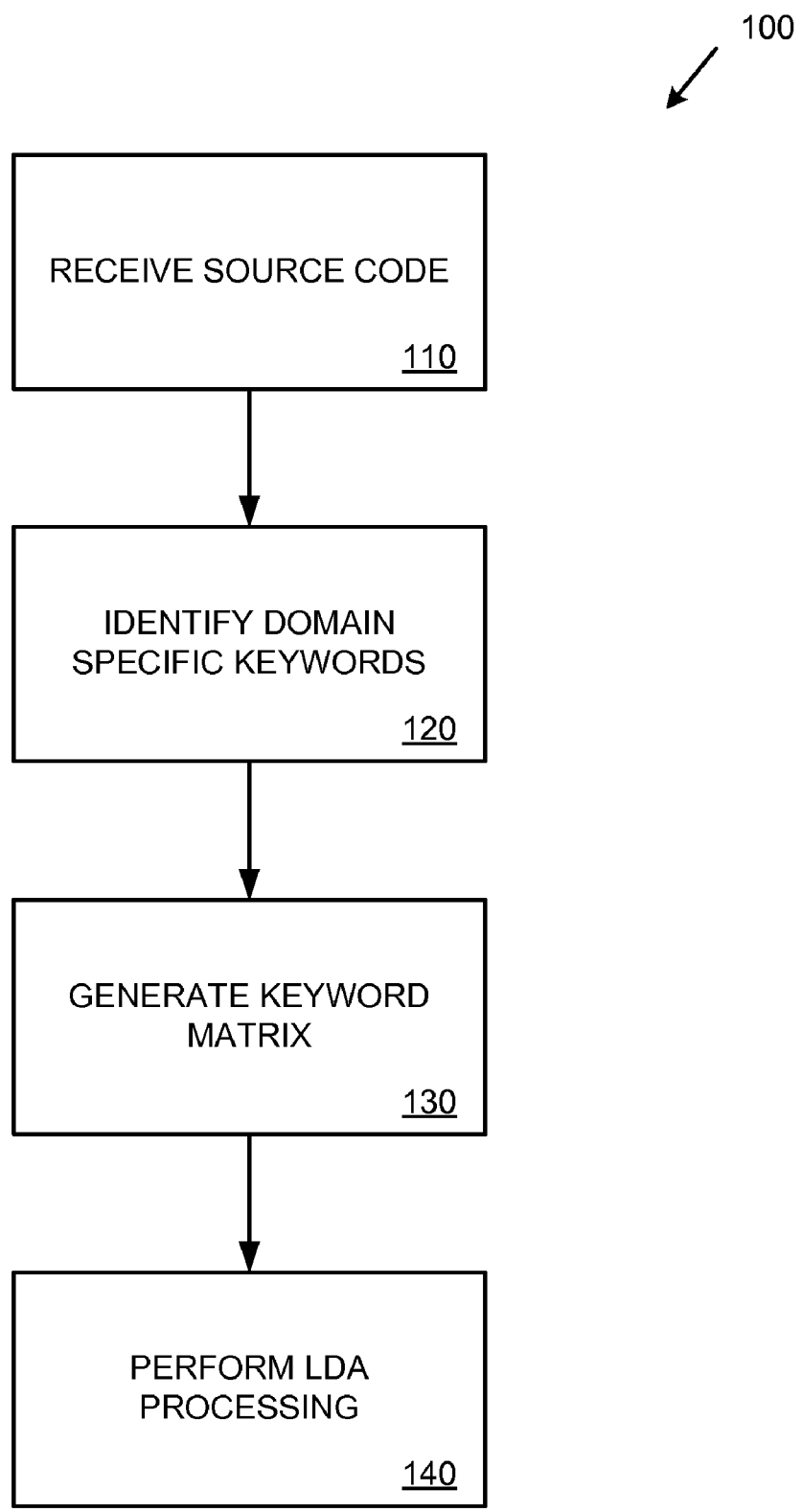
FIG. 1 is a flowchart showing an exemplary method for identifying topics in source code.

Generally, the described technologies deal with the identification (e.g., extraction) of topics (e.g., business topics) in computer source code using, at least in part, Latent Dirichlet Allocation (LDA). LDA is a statistical model that can be applied to discover concepts in text documents. The LDA model is described in D. Blei, A. Ng, and M. Jordan, "*Latent dirichlet allocation*," Journal of Machine Learning Research, 3:993-1022, 2003, incorporated herein by reference.

The basic idea of LDA is that a document can be considered as a mixture of a limited number of topics and words in the document can be associated with one, or more, of these topics. Generally, each topic in a document can be considered a mixture of one or more of the words in the document. Given a corpus of documents, LDA attempts to discover the following:

It identifies a set of topics.

It associates a set of words with a topic.

It defines a specific mixture of these topics for each document in the corpus.

The vocabulary for describing the LDA model is as follows:

Word. A word is a basic unit defined to be an element of a vocabulary W.

Document. A document is a sequence of N words denoted by $d=(w_1, \ldots, w_n)$ where $w_n$ is the $n^{th}$ word in the sequence.

Corpus—A corpus is a collection of M documents denoted by $D=\{d_1, \ldots, d_M\}$.

In statistical natural language processing, it is common to model each document d as a multinomial distribution $\theta^{(d)}$ over T topics, and each topic $z_j, j=1 \ldots T$ as a multinomial distribution $\phi^{(j)}$ over the set of words W. In order to discover the set of topics used and the distribution of these topics in each document in a corpus of documents D, we need to obtain an estimate of $\phi$ and $\theta$. The LDA model improves on previous techniques of estimating $\phi$ and $\theta$, which are prone to overfitting. The LDA based model assumes a prior Dirichlet distribution on $\theta$, thus allowing the estimation of $\phi$ without requiring the estimation of $\theta$.

LDA assumes a generative process for creating a document as presented below. For additional details regarding LDA, including definitions of variables, please see Blei, "*Latent dirichlet allocation*," as cited above.

1. Choose N~Poisson($\xi$): Select the number of words N
2. $\theta$~Dir($\alpha$): Select $\theta$ from the Dirichlet distribution parameterized by $\alpha$.
3. For each $w_n \in w$ do:
   a. Choose a topic $z_n$~Multinomial($\theta$)
   b. Choose a word $w_n$ from $p(w_n|z_n, \beta)$, a multinomial probability $\phi^{z_n}$ (this can also be described as: choose a word $w_n$~Multinomial($\phi^{z_n}$)

In this model, various distributions, namely the topics, topic distributions for each of the documents, and the word probabilities for each of the topics are in general intractable for exact inference. Hence a wide variety of approximate algorithms are used with LDA. These algorithms attempt to maximize likelihood of the corpus given the model. Some algorithms that have been proposed for fitting the LDA model to a text corpus are variational Bayes, expectation propagation, and Gibbs sampling.

Example 2

Exemplary Topics

In the technologies described herein, a topic is a description of software functionality. Generally, topics refer to the concepts (such as business concepts) addressed by software. Topics, also called business topics, concepts, business concepts, or domain concepts, can be helpful in identifying and comprehending the functional intent of the software. For example, identifying topics can help locate specific areas of software (e.g., a specific file or module) that deal with the topic (e.g., for fixing a bug or making a feature enhancement dealing with the identified topic).

For example, a financial software system may have a number of topics, such as "loan," "customer," "bank," "account," and so on.

Example 3

Exemplary Source Code Identifiers

In the technologies described herein, source code identifiers are entities in source code that are capable of indicating a topic. Source code identifiers include names of various source code entities and related comments. Some examples of source code identifiers are file names, function names, module names, class names, attribute names, method names, data structure names, variable names, comments, and so forth.

Source code identifiers can be a valuable source of information when trying to determine the purpose or function of software. For example, in many software systems, file names indicate the functionality performed by the code in the file.

Example 4

Exemplary Mapping of LDA to Source Code

The Latent Dirichlet Allocation (LDA) statistical model was not designed specifically to operate on source code. In order to apply LDA to source code, a mapping of source code structure is applied.

In a specific implementation, in order to apply LDA in source code, a software system is considered to be a collection of source code files, and the software system is considered to be associated with a set of domain concepts (or topics). For instance, the Apache web server implements functionality associated with http-proxy, authentication, server, caching, and so on. Similarly, a database server implements functionality related to storage management. Generally, there exists a many-to-many relationship between topics (e.g., authentication, storage management, etc.) and the source code files that implement these topics. Thus, a source code file can be thought of as a mixture of topics. Although all software systems are different, and some software systems may contain files that implement functionality related to only a single topic.

Applying LDA to the source code reduces to mapping source code entities of a software system to the LDA model, described in Table 1 below. Given this mapping, application of LDA to a source code corpus can be accomplished.

TABLE 1

| LDA to Source Code Mapping | |
|---|---|
| LDA Model | Source Code |
| Word | We define domain specific keywords extracted from names of program elements such as functions, files, data structures and comments to be the vocabulary set V with cardinality W. A word w is an item from this vocabulary. |
| Document | A source code file becomes a document in LDA terminology. A document is represented as: $f_d = (w_1, w_2, \ldots, w_N)$ to be a sequence of N domain specific keywords. |
| Corpus | The software system $S = (f_1, f_2, \ldots, f_M)$ having M source code files forms the corpus. |

Given a software system consisting of a set of source code files, domain specific keywords are identified from the source code files. Using this, a file-keyword matrix is constructed where source code files form the rows, keywords form the columns, and each cell represents the weighted occurrence of the keyword, representing the column, in the source code file representing the row. This file-keyword matrix is provided as input to LDA. The result of LDA is a set of topics (e.g., output as collections of domain specific keywords, where the collections correspond to the topics, along with the importance of each keyword to the topic represented as a numeric fraction). Another result of LDA can be a distribution of topics in each source code file.

More specifically, the main input of LDA topic extraction is the file-keyword matrix $wd[w, f_d] = \eta$ where $\eta$ is a value indicating the importance of the word w in the file $f_d$. Example 6 below describes how to compute $\eta$, in a specific implementation. Also, in a specific implementation, Gibbs sampling, which uses a Markov chain Monte Carlo method to converge to the target distributions in an iterative manner, is used. Gibbs sampling is described in T. Griffiths and M. Steyvers, "*Finding Scientific Topics*," Proc Natl Acad Sci U S A, Vol. 101 Suppl 1 (6 Apr. 2004), pp. 5228-5235, which is incorporated herein by reference.

Example 5

Exemplary Identification of Keywords

In order to identify the keywords needed for input to the LDA model, they must first be extracted from the source code. Source code generally has more structure than a plain text document, such as a magazine article. Furthermore, source code contains many words that are not likely to be domain specific keywords (words that might indicate a topic).

Identifying keywords in source code is problematic for a number of reasons. First, a large percentage of words in source code files constitute the programming language syntax, such as "for," "if," "class," "return," "while," and so on. Second, domain specific keywords are often embedded inside identifier names as subwords, so identifier names need to be split (segmented) appropriately to extract the relevant subwords.

In a specific implementation, the following steps are performed in order to identify likely domain specific keywords in source code:
1. Extract source code identifiers from the source code.
2. Split the source code identifiers.
3. Stem the resulting split keywords.
4. Filter the keywords.

The first step, extracting source code identifiers from source code, is the process of parsing source code (e.g., source code files or documents) and extracting source code identifiers such as file names, function names, comments, etc.

The second step is to split the extracted source code identifiers. Splitting of identifiers into subwords is performed because, unlike a natural language text where words are typically more independent, source code identifiers are generally not independent words but rather a sequence of meaningful chunks of letters and acronyms delimited by some character or through some naming convention. For instance a function named "add_auth_info" in source code contains three meaningful chunks of letters "add", "auth", and "info" delimited by an underscore. In order to perform this splitting it is important to know how the identifiers are delimited. There are a number of schemes such as using an underscore, a hyphen, or through capitalization of specific letters (e.g., such as "getLoanDetails"). In a specific implementation, the splitting is performed using regular expressions in Perl.

Splitting can also be performed on regular language words. For example, compound words, such as "passport," "blackboard," and "takeout," can be split.

The result of the splitting (the individual chunks) are potential domain specific keywords. Therefore, a source code identifier is typically split into one or more potential domain specific keywords. However, some source code identifiers do not need to be split (e.g., comments may contain natural language text which does not require splitting).

The third step is stemming. Generally keywords in source code are used both singularly as well as in plural. For example "loan" and "loans." In a specific implementation, keywords are not considered separately as singular and plural. Instead, keywords are unified by stemming them to their common root. In a specific implementation, a stemming algorithm described by Porter (M. F. Porter, "*An algorithm for Suffix Stripping*," Morgan Kaufmann Publishers Inc., San Francisco, Calif., USA, 1997), incorporated herein by reference, is used for stemming all of the potential domain specific keywords (resulting from the previous splitting step) into a common root. However, depending on the specific implementation, stemming may or may not be performed. Furthermore, in addition to, or instead of, stemming, verb conjugation can be performed.

The fourth step is filtering. In the filtering step, the potential domain specific keywords (e.g., after being stemmed) are filtered. Not all keywords are indicators of topics in source code. For example, words such as "get", "if", "set" are typically generic and thus not good indicators. Such words are filtered out (e.g., by comparing the potential keywords to a list of words to filter out). The result is a set of domain specific keywords that are considered likely to indicate a topic.

While the filtering attempts to remove those potential keywords that are not likely to indicate a topic, the filtering is generally not perfect. However, this is not a problem as the LDA processing can handle some keywords that are not strongly correlated to a topic, particularly those of low frequency.

While the above steps are performed in a specific implementation to try and extract likely domain specific keywords, other implementations use different steps. For example, in another implementation the filtering step is not performed.

Example 6

Exemplary Keyword Matrix

In the technologies described herein, a keyword matrix (e.g., a file-keyword matrix) is used as input to LDA. The keyword matrix comprises weighted occurrences of domain specific keywords in source code. For example, in a specific implementation a file-keyword matrix comprises weighted occurrences of domain specific keywords in source code files. In other implementations, however, different source code divisions are used (e.g., a function-keyword matrix that comprises weighted occurrences of domain specific keywords in functions in source code).

For the file-keyword matrix, a weighted sum of the number of occurrences of a domain specific keyword w in a file $f_d$ is computed as follows. First, a heuristic weightage is defined as follows:

$$\lambda:\{lt\}\to X$$

The heuristic weightage assigns a user-defined value (e.g., a user-defined positive integer) to a "location type" lt. The "location type" lt denotes the structural part of a source code file such as file name, function name, formal parameter name, comment, data-structure name and so on from which a domain specific keyword has been obtained. For example, a different weighting (a different weighting value) can be applied to keywords obtained from function names versus keywords obtained from file names. Assigning different weighting based on location type can take into account differences between software systems (e.g., some software systems may have more descriptive file names than function names, while others may have more descriptive module names than file names).

Second, The importance factor $wd[w,f_d]$ for a word w occurring in the file $f_d$ is computed by the weighted sum of the frequency of occurrences of w for each location type $lt_i$ in a source code file $f_d$, as follows:

$$wd[w,f_d]=\Sigma_{lt_i}\lambda(lt_i)\times v(w,f_d,lt_i)$$

Where $v(w,f_d,lt_i)$ denotes the frequency of occurrence of the word w in the location type $lt_i$ of the source file $f_d$.

The following example illustrates the calculation of the importance factor. For the example calculation, the following Java source code excerpt (from the file OrderDetails.java) is used.

```
public class OrderDetails implements java.io.Serializable {
    private String orderId;
    private String userId;
    private String orderDate;
    private float orderValue;
    private String orderStatus;
    public String getOrderStatus( ) {
        return(orderStatus);
    }
}
```

As discussed in Example 5, source code identifiers are extracted from source code and domain specific keywords are obtained. Using the above code sample, one domain specific keyword that could be obtained is "Order." For example, the class name "OrderDetails" could be split into "Order" and "Details." Note that the domain specific keyword "Order" occurs in various location types, specifically in a class name, in variable names (in this example, we are limiting variable names to variable declarations), and in a method name. In a specific implementation, class names of object oriented systems are more likely to yield domain specific keywords that are important to a topic. Therefore, for this example calculation, class location types are assigned a higher weighting (a higher importance) than variable names and method names. For this calculation, let $\lambda(class)=2$, let $\lambda(variable)=1$, and let $\lambda(method)=1$. The importance factor of the domain specific keyword "Order" in the above code sample is calculated as follows:

$$wd[Order, OrderDetails.java]=2*1+1*4+1*1=7$$

Similarly, weighted occurrence can be calculated for other domain specific keywords in the above code sample, such as for "details," "user," and "status". Weighted occurrence cal so be calculated for domain specific keywords not in the code sample, however the result would be 0 (zero).

Below is an example file-keyword matrix. Each row represents a source code file, and each column is a domain specific keyword. For example, keyword 1 could be "Order," keyword 2 could be "Details," and so on.

|        | Keyword 1 | Keyword 2 | Keyword 3 | Keyword 4 |
|--------|-----------|-----------|-----------|-----------|
| File 1 | 7         | 1         | 12        | 0         |
| File 2 | 4         | 6         | 3         | 1         |
| File 3 | 3         | 3         | 4         | 8         |

Instead of using positive integers as weights, other values could be used (e.g., fractions or negative integers).

Instead of dividing the source code by file, other divisions can be used. For example, the source code can be divided by class, function, directory, etc. For example, instead of a file-keyword matrix, a class-keyword matrix can be used that comprises weighted occurrences of domain specific keywords in classes of the source code. The calculations would be the same as described above, just replacing "file" with the alternate division.

In a specific implementation, cohesion data and coupling data are treated differently. Cohesion data is data (e.g., source code identifiers, and resulting keywords) that is closely related in source code. For example, keywords from a file name, methods in the file, and data structures in the methods in the file would be considered cohesion data. Coupling data is data that is typically not closely related in the source code, or at least not as closely related as cohesion data. For example, consider a first method (method1), and within method1 there is a method call to a second method (method2). Just because method2 is called from method1 does not mean they are strongly related. For example, within a method "GetLoanDetails" there is a call to the method "GetCustomerDetails," where "loan" is a different topic than "customer." In the specific implementation, method or function calls are not taken into account for weighting (e.g., if a particular domain specific keyword occurs in a method call, it is not considered in the weighting for the particular domain specific keyword).

Example 7

Exemplary Topic Labeling

There are a number of options for labeling (naming) topics. For example, topics can be labeled automatically or manually. An automatic labeling process could involve selecting the highest probability domain specific keyword for use as the topic label. However, in some situations, automatically determining an appropriate label can be problematic.

In a specific implementation, topic labeling is performed manually. For example, a human operator can view the topics identified by LDA, where each topic comprises a list of domain specific keywords, and assign a label (a name) to the topic.

Example 8

Exemplary LDA Parameters

In a specific implementation, a number of parameters are provided as input, including $\alpha$ and $\beta$, and an LDA implementation infers the distribution $\phi$ of words over topics and the distribution $\theta$ of topics over documents. In addition to the parameters $\alpha$ and $\beta$, a number of iterations is also used. The $\alpha$ parameter controls the division of documents into topics, and the $\beta$ parameter controls the division of topics into words. Larger values of $\beta$ yield coarser topics and larger values of $\alpha$ yield coarser distribution of documents into topics. Therefore, the appropriate values of $\alpha$ and $\beta$ are needed to derive good quality topics and assignment of topics to documents. In some implementations, these values are estimated on-the-fly, while in other implementations they are input as user-defined values.

Note that LDA defines a topic as a probability distribution over all the terms in the corpus. Therefore, an optional user-defined parameter can be used (e.g., $\psi$) in order to provide a cut-off so that only the most important words for each topic are returned.

Example 9

Exemplary Configuration File

In some implementations, a configuration file is used to provide parameters and other data as input to the topic identification techniques described herein. The configuration file can comprise one or more of the following parameters and data: $\alpha$ (alpha), $\beta$ (beta), desired number of topics, and number of iterations.

In a specific implementation, the value of $\alpha$ is 50/T (wherein T is a user-defined parameter for the desired number of topics), the value of $\beta$ is 0.1, and the number of iterations is 2000. In this specific implementation, the configuration file also includes reference to a training file, a vocabulary file, and an entity file. The vocabulary file contains one or more words of the source code and maps each word to an integer index.

The entity file contains one or more files and maps each file to a unique integer index. The training file links the vocabulary file and the entity file. For example if the keyword "loan" occurs repeatedly in a number of files, the vocabulary file could encode "loan" to the integer index "10". Similarly, the file "loanComputation.c" could be encoded as the integer index "5" in the entity file. Then, the corresponding entry in the training file could be "5,10,6" (word index, file index, sum) indicating that the file "loanComputation.c" is associated with term "loan" and the weighted sum is 6. The following is an example configuration file for this specific implementation.

```
<lda>
    <gibbsDataFile>gibbs.data</gibbsDataFile>      <!-- training file -->
    <vocabFile>vocab1.data</vocabFile>             <!-- vocabulary file -->
    <entityFile>entity1.data</entityFile>          <!-- entity file -->
    <T>40</T>                                      <!-- number of topics-->
    <alpha>1.25</Alpha>
    <Beta>0.1</Beta>
    <Iterations>2000</iterations>
    <topicsWord>20</topicsWord>
</lda>
```

Given a topic, there can be number of keywords belonging to that topic with some probability. Keywords with high probability would be more relevant to the topic than terms with low probability. So, instead of returning all keywords associated with a topic, even those whose probability is negligible, only the most relevant keywords can be returned. In the example configuration file, <topicsword> represents a user-defined maximum number of keywords to be returned for any given topic. In a specific implementation, the top 20 keywords are returned.

Example 10

Exemplary Method for Identifying Topics in Source Code

FIG. 1 shows an exemplary method 100 for identifying topics in source code (e.g., in source code files or documents). The method 100 can be implemented, in full or in part, by a computing device (e.g., desktop computers, notebook computers, server computers, portable computing devices, and the like).

At 110, source code is received (e.g., source code files or other divisions of source code, such as classes, functions, modules, etc.). The source code can be source code related to a single application or multiple applications. The source code can be related to a specific module or aspect of a software system.

At 120, domain specific keywords are identified from the source code. In a specific implementation, domain specific keywords are identified by extracting source code identifiers from the source code, splitting the source code identifiers to obtain potential domain specific keywords, and filtering the potential domain specific keywords. Stemming can also be performed on the potential domain specific keywords.

At 130, a keyword matrix is generated (e.g., a file-keyword matrix). The keyword matrix comprises weighted sums of occurrences of the domain specific keywords in the source code (e.g., a file-keyword matrix comprising weighted sums of occurrences of domain specific keywords in source code files).

At 140, LDA processing is performed. The LDA processing takes the keyword matrix and the source code as input. The LDA processing outputs topics as collections of domain specific keywords as and probabilities of keywords belonging to their respective topics (e.g., as depicted in Tables 2 through 6). The topics identified by LDA (where a topic is a distribution over keywords) are output as collections of domain specific keywords, where each collection corresponds to a different topic. Topics can be labeled (named) manually or automatically. The output of LDA can also be described as a topic-keyword matrix whose entries correspond to probabilistic associations between topics and keywords.

In addition, other parameters can be provided as input to the LDA processing (e.g., alpha, beta, number of topics, number of iterations, etc.). The other parameters and data can be input in the form of a configuration file.

Example 11

Exemplary Method for Obtaining Potential Domain Specific Keywords

Figure 2:
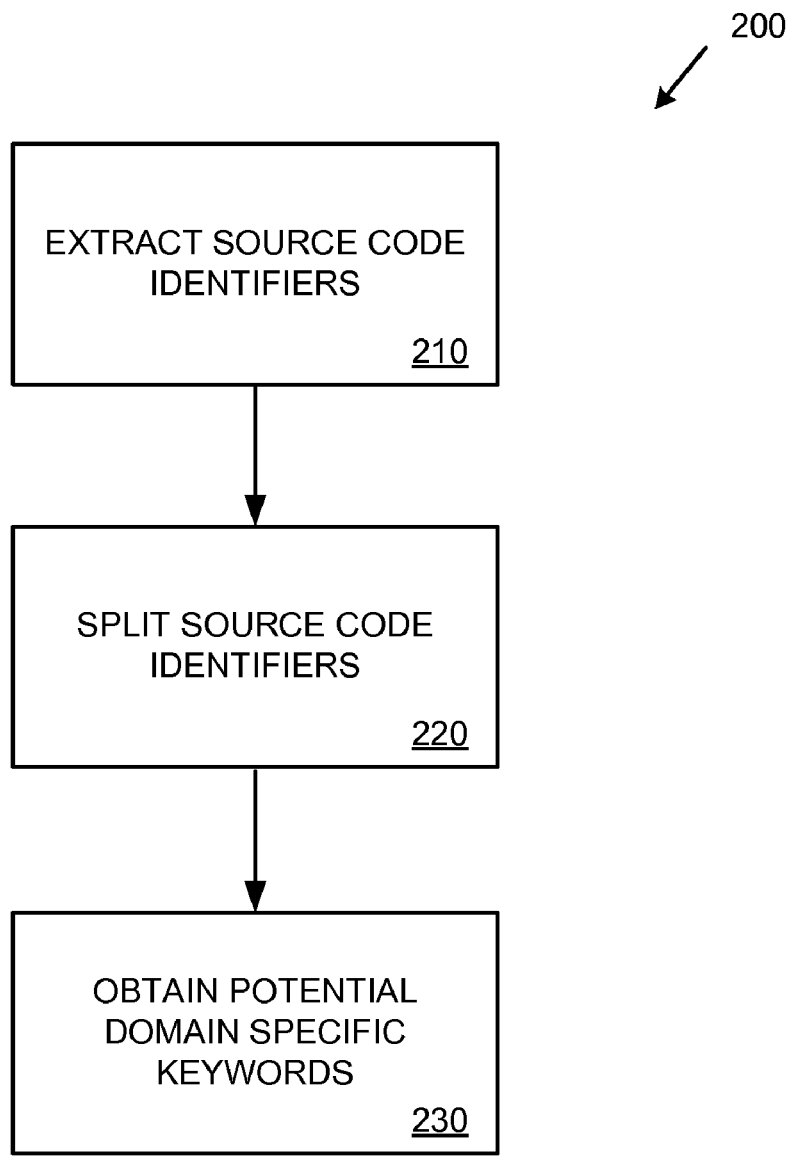
FIG. 2 is a flowchart showing an exemplary method for obtaining potential domain specific keywords.

FIG. 2 shows an exemplary method 200 for obtaining potential domain specific keywords. At 210, source code identifiers are extracted from source code. At 220, the extracted source code identifiers are split. At 230, potential domain specific keywords are obtained. For example, a source code identifier "getInterestRate" could be split into the domain specific keywords "get," "Interest," and "Rate".

Example 12

Exemplary Method for Obtaining Domain Specific Keywords

Figure 3:
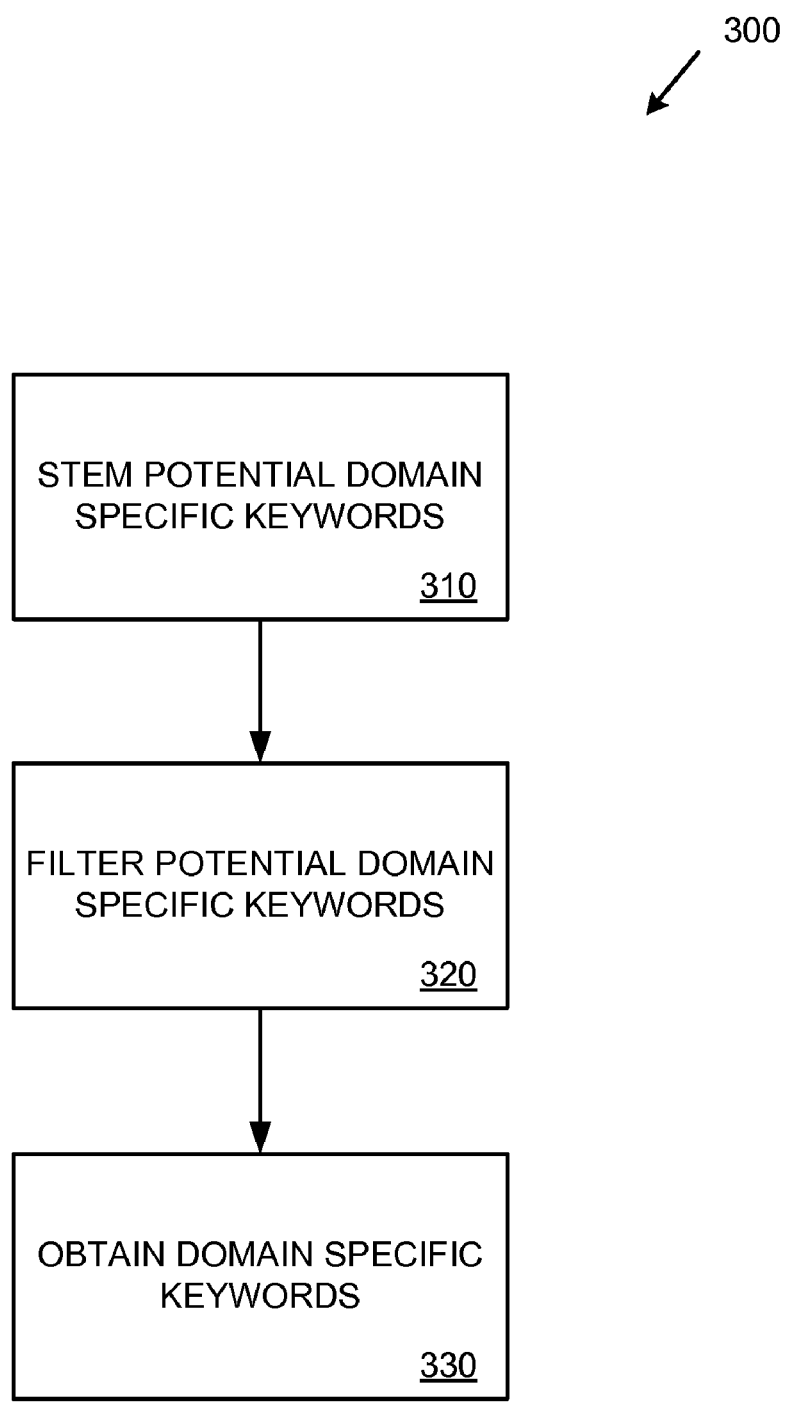
FIG. 3 is a flowchart showing an exemplary method for obtaining domain specific keywords.

FIG. 3 shows an exemplary method 300 for obtaining domain specific keywords. At 310, potential domain specific keywords (e.g., such as obtained by the example method depicted in FIG. 2) are stemmed. At 320, potential domain specific keywords are filtered. Filtering removes those potential keywords that are not likely to indicate a topic. For example, for the set of potential domain specific keywords "get", "Interest", and "Rate" (obtained from the source code identifier "getInterestRate"), the "get" potential keyword could be filtered out, depending on the implementation.

At 330, domain specific keywords are obtained. The domain specific keywords are those potential domain specific keywords that remain after the filtering (i.e., that are not filtered out). In the above example, "Interest" and "Rate" might be the domain specific keywords, depending on the implementation.

Example 13

Exemplary Tool

Figure 4:
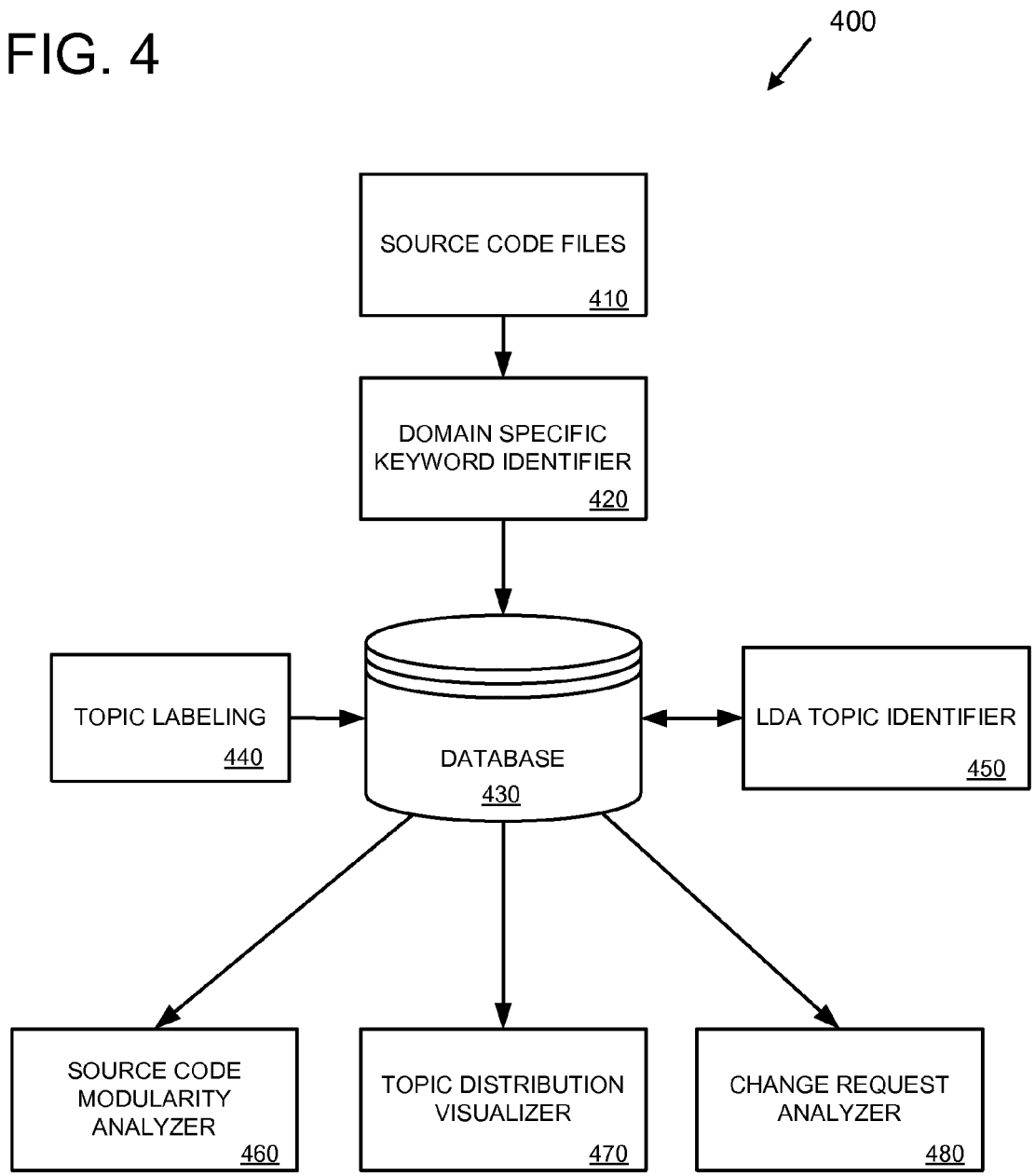
FIG. 4 is a block diagram depicting an exemplary tool for identifying topics in source code.

In the technologies described herein, a tool (e.g., a software application) can be used to identify topics in source code using LDA. FIG. 4 shows an example tool 400 for identifying topics in source code using LDA.

In the example tool 400, a domain specific keyword identifier 420 identifies domain specific keywords from source code files 410. Domain specific keywords are stored in a database 430. The database 430 can store other types of information, such as source code identifiers, topics, file-keyword matrices, source code files, potential domain specific keywords, parameters, configuration files, etc.

The tool 400 includes a LDA topic identifier 450. The LDA topic identifier 450 can use the information stored in the database (e.g., domain specific keywords, file-keyword matrices, source code files, and parameters) to identify topics in source code. Results of the identification (e.g., collections of domain specific keywords and probabilities) can be stored in the database 430.

Topic labeling 440 can be used to label topics identified by the LDA topic identifier 450. For example, topic labeling 440 can be used to receive topic labels entered by a user.

Various displays and reports can be used to view results from the topic identification tool. A change request analyzer 480 can be used to identify location(s) in source code corresponding to specific topics (e.g., the files and/or modules associated with one or more topics). A topic distribution analyzer 470 can be used to view the topics present in a file, module, function, or the like. A source code modularity analyzer 460 can be used to analyze and display modularity information for the source code files 410.

Example 14

Exemplary Case Studies

Following are two case studies implementing the technologies described herein to identify topics in source code using LDA. The first case study involves the Apache Hypertext Transfer Protocol (HTTP) server source code. In the case study, 30 topics were extracted from the Apache HTTP server source code. Listed in Tables 2 and 3 below are two of the topics, "SSL" and "Logging." "SSL" is a topic in Apache concentrated in one module, while "Logging" is spread across multiple modules. Table 2 lists the top keywords for the topic labeled "SSL" and their corresponding probability of occurrence when a random keyword is generated from the topic "SSL." Table 3 lists the top keywords for the topic labeled "Logging" and their corresponding probability of occurrence when a random keyword is generated from the topic "Logging." Identification of topics includes infrastructure-level topics and cross cutting topics. For instance, "Logging" is a topic that cuts across files and modules. The technologies described herein are able to cluster together many logging related keywords as shown in Table 3.

TABLE 2

Topic Labeled as "SSL"

| Keyword | Probability |
|---------|-------------|
| ssl | 0.373722 |
| expr | 0.042501 |
| init | 0.033207 |
| engine | 0.026447 |
| var | 0.022222 |
| ctx | 0.023067 |
| ptemp | 0.017153 |
| mctx | 0.013773 |
| lookup | 0.012083 |
| modssl | 0.011238 |
| ca | 0.009548 |

TABLE 3

Topic Labeled as "Logging"

| Keyword | Probability |
|---------|-------------|
| log | 0.141733 |
| request | 0.036017 |
| mod | 0.0311 |

TABLE 3-continued

Topic Labeled as "Logging"

| Keyword | Probability |
|---------|-------------|
| config | 0.029871 |
| name | 0.023725 |
| headers | 0.021266 |
| autoindex | 0.020037 |
| format | 0.017578 |
| cmd | 0.01512 |
| header | 0.013891 |
| add | 0.012661 |

The second case study involves Petstore, a J2EE blueprint implementation. Being a reference J2EE implementation, it follows good Java naming conventions and a large number of identifiers have meaningful names. Table 4 lists the top keywords for the topic labeled "Contact Information" and their corresponding probability of occurrence when a random keyword is generated from the topic "Contact Information." Table 5 lists the top keywords for the topic labeled "Address Information" and their corresponding probability of occurrence when a random keyword is generated from the topic "Address Information."

Note that the "Address Information" and "Contact Information" topics are related. Specifically, "Address Information" is a narrower topic (and possibly a subset of) "Contact Information." Significantly, the topic identification technologies described herein were able to identify them as separate topics.

It is interesting to note that with this case study, the top keywords, "info" and "contact," are indicative of the label of the topic. This case study illustrates how topic labels can be automatically generated from keywords. For example if we concatenate these two keywords it can be considered as a valid label for the "contact information" topic.

Similarly, even in the case of the "Address Information" topic shown in Table 5 below, the concatenation of the top two keywords "address" and "street" could be used to label the "Address Information" topic. It can be observed from the sample topics extracted that a good naming convention yields more meaningful names thereby simplifying the process of labeling the topics.

TABLE 4

Topic Labeled as "Contact Information"

| Keyword | Probability |
|---------|-------------|
| info | 0.418520 |
| contact | 0.295719 |
| email | 0.050116 |
| address | 0.040159 |
| family | 0.040159 |
| given | 0.036840 |
| telephone | 0.026884 |
| by | 0.000332 |

TABLE 5

Topic Labeled as "Address Information"

| Keyword | Probability |
|---------|-------------|
| address | 0.398992 |
| street | 0.105818 |
| city | 0.055428 |
| code | 0.055428 |

TABLE 5-continued

Topic Labeled as "Address Information"

| Keyword | Probability |
|---|---|
| country | 0.055428 |
| zip | 0.055428 |
| name1 | 0.050847 |
| state | 0.046267 |
| name2 | 0.046267 |
| end | 0.005039 |
| add | 0.009548 |

Example 15

Exemplary Synonymy and Polysemy Resolution

One factor in extracting coherent topics and grouping semantically related keywords together is the ability of the algorithm employed to resolve synonymy-different words having the same meaning. In certain situations, the technologies described herein are able to resolve synonymy to a good extent because LDA models topics in a file and words in a topic using multinomial probability distributions. For instance, consider the topic labeled as "Transaction" in PostgreSQL shown in Table 6 below. LDA has identified that "transaction" and "xact" are synonymous and grouped them together in the same topic.

TABLE 6

Topic Labeled as "Transaction"

| Keyword | Probability |
|---|---|
| transaction | 0.149284 |
| namespace | 0.090856 |
| commit | 0.035349 |
| xact | 0.035349 |
| visible | 0.029506 |
| current | 0.029506 |
| abort | 0.026585 |
| names | 0.026585 |
| command | 0.023663 |
| start | 0.020742 |
| path | 0.017821 |

Another interesting feature of the technologies described herein is that they have been able to resolve polysemy-same words having different meaning in source code. A polyseme can appear in multiple topics depending on the context. Note that LDA models a topic as a distribution of terms; therefore it is perfectly valid for a term to appear in two topics with different probability values. Furthermore, LDA tries to infer a topic for a given term with the knowledge of the context of the word (e.g., the document where the word is appearing). LDA is able to infer the correct topic for a polysemous term by checking candidate topic terms for their presence or absence in the document. For instance, when LDA was applied to Linux-kernel source code the term "volume" was used in the context of sound control as well as in the context of file systems. LDA is able to differentiate between these different uses of the term and group the same term in different topics.

Example 16

Exemplary Number of Topics

In a specific implementation, the desired number of topics to identify is a user-defined parameter. The selected number of topics can have an impact on polysemy resolution (the number of topics is a tradeoff between polysemy and synonymy detection). For instance, consider the example of polysemy resolution for the keyword "volume" in Linux-kernel, discussed above. In two specific tests run on Linux-kernel source code, all parameters were kept the same except for the number of topics. For the first test, the number of topics (T) was set to 50, and for the second test, the number of topics was set to 60. In both tests, of the total topics extracted, two topics were "sound" related topics and one topic was "file systems." Table 7 below lists the probabilities of the keyword "volume" in "sound" and "file systems" topics for both of the tests.

TABLE 7

Effect of number of topics on polysemy resolution in Linux-kernel

| Topic type | 'Volume' probability for first test with T = 50 | 'Volume' probability for second test with T = 60 |
|---|---|---|
| Sound topic 1 | 0.024 | 0.032 |
| Sound topic 2 | 0.009 | 0.009 |
| File systems topic | <0.0002 | 0.004 |

For these tests, the threshold value was set to 0.001 for determining whether a keyword belongs to a topic or not. If the probability of a keyword associated with a topic is less than 0.001 then that keyword is not considered to be an indicator of that topic. In view of this, it can be observed from Table 7 that in the first test the keyword "volume" has a probability of less than 0.0002 for the topic "file systems." Hence "volume" is associated with only the two sound related topics and not with the "file systems" topic. However, in the second test when the number of topics is increased to 60, the probability of "volume" for the topic "file systems" is 0.004. This probability is greater than the threshold 0.001 and hence "volume" is also considered an indicator for the "file systems" topic in addition to the two sound related topics. The polysemy in the keyword "volume" is revealed only in the second test with 60 topics.

In general, a user-defined threshold value can be set for determining whether a keyword belongs to a topic or not.

Example 17

Exemplary User Intervention

As discussed herein, various parameters and steps can be performed automatically by a computing device or they can be performed manually by a person. Regarding filtering the potential domain specific keywords, there can be benefits to manually performing the procedure. For example, an expert may be better able to identify which potential keywords to filter out (e.g., those potential keywords that are merely code operators, or that are generic for the specific software application at issue). Similarly, an expert could evaluate the weighting to apply to the various location types (e.g., file names, function names, variable names) depending on the application at issue (e.g., a software system with descriptive file names can be assigned a greater weight for the file name location type).

Regarding topic identification, manual intervention can be applied to produce better results. For example, resulting topics identified using initial parameters (e.g., number of topics, alpha, and beta) can be evaluated by an expert. Depending on the results, the procedure can be run again with different parameters (this can be repeated as necessary).

Example 18

Exemplary Computing Environment

Figure 5:
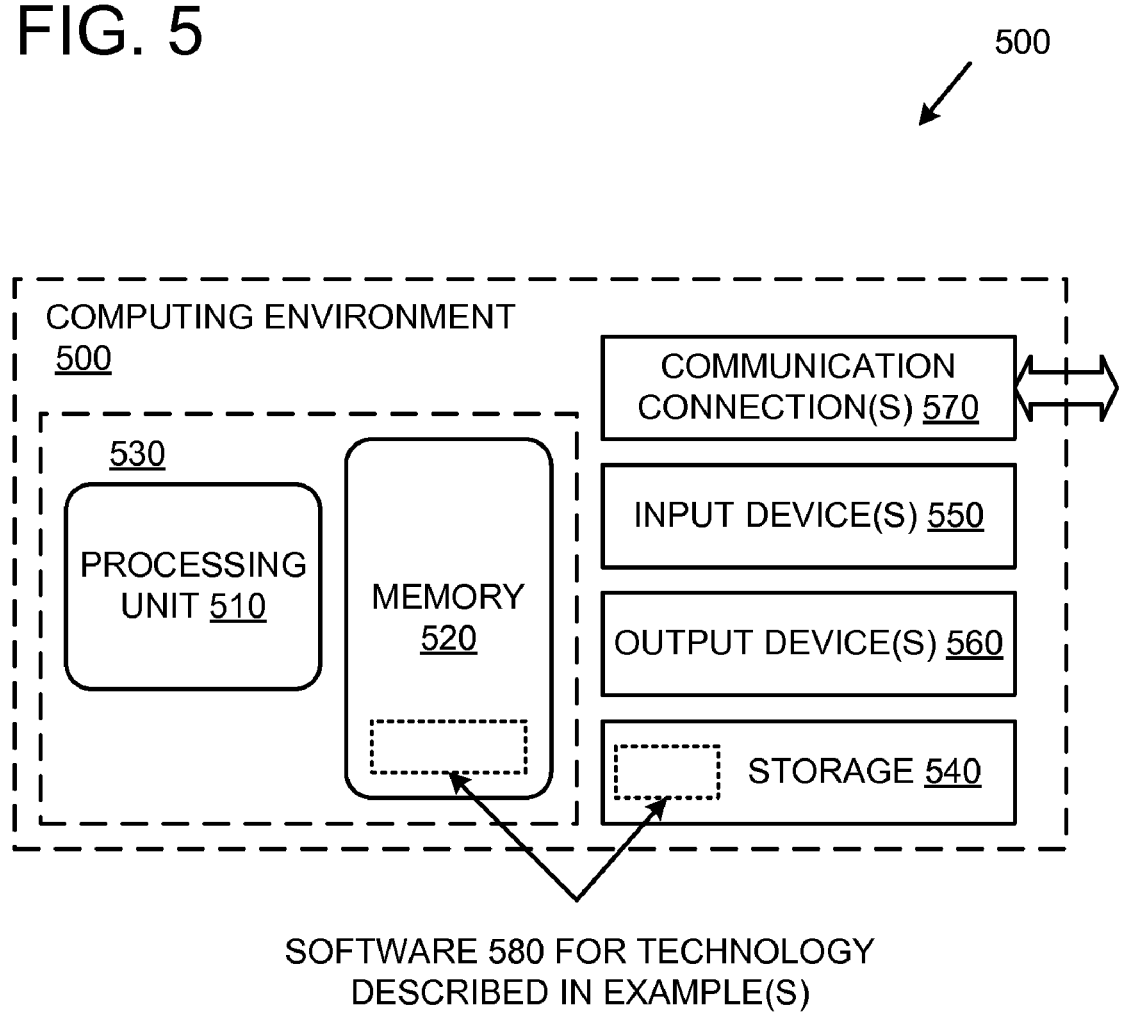
FIG. 5 is a block diagram illustrating an example of a computing environment that can be used to implement any of the technologies described herein.

FIG. 5 illustrates a generalized example of a suitable computing environment 500 in which described embodiments, techniques, and technologies may be implemented. The computing environment 500 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 5, the computing environment 500 includes at least one central processing unit 510 and memory 520. In FIG. 5, this most basic configuration 530 is included within a dashed line. The central processing unit 510 executes computer-executable instructions and may be a real or a virtual processor. In a multi-processing system, multiple processing units execute computer-executable instructions to increase processing power and as such, multiple processors can be running simultaneously. The memory 520 may be volatile memory (e.g., registers, cache, RAM), non-volatile memory (e.g., ROM, EEPROM, flash memory, etc.), or some combination of the two. The memory 520 stores software 580 that can, for example, implement the technologies described herein. A computing environment may have additional features. For example, the computing environment 500 includes storage 540, one or more input devices 550, one or more output devices 560, and one or more communication connections 570. An interconnection mechanism (not shown) such as a bus, a controller, or a network, interconnects the components of the computing environment 500. Typically, operating system software (not shown) provides an operating environment for other software executing in the computing environment 500, and coordinates activities of the components of the computing environment 500.

The storage 540 may be removable or non-removable, and includes magnetic disks, magnetic tapes or cassettes, CD-ROMs, CD-RWs, DVDs, or any other medium which can be used to store information and which can be accessed within the computing environment 500. The storage 540 stores instructions for the software 580, which can implement technologies described herein.

The input device(s) 550 may be a touch input device, such as a keyboard, keypad, mouse, pen, or trackball, a voice input device, a scanning device, or another device, that provides input to the computing environment 500. For audio, the input device(s) 550 may be a sound card or similar device that accepts audio input in analog or digital form, or a CD-ROM reader that provides audio samples to the computing environment 500. The output device(s) 560 may be a display, printer, speaker, CD-writer, or another device that provides output from the computing environment 500.

The communication connection(s) 570 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 500. By way of example, and not limitation, with the computing environment 500, computer-readable media include memory 520, storage 540, communication media (not shown), and combinations of any of the above.

Example 19

Exemplary Automated Methods

Any of the methods described herein can be performed via one or more computer-readable media (e.g., storage media) having computer-executable instructions for performing such methods. Operation can be fully automatic, semi-automatic, or involve manual intervention.

Example 20

Exemplary Combinations

The technologies of any example described herein can be combined with the technologies of any one or more other examples described herein.

Example 21

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, implemented at least in part by a computing device, for identifying topics in source code using Latent Dirichlet Allocation (LDA), the method comprising:
   receiving software source code;
   identifying domain specific keywords from the software source code;
   generating a keyword matrix, wherein the keyword matrix comprises weighted sums of occurrences of the domain specific keywords in the software source code;
   processing, using LDA, the keyword matrix and the software source code; and
   outputting, from the processing, collections of domain specific keywords and probabilities, wherein the collections corresponds to respective topics identified by LDA in the software source code.

2. The method of claim 1 wherein each collection comprises one or more of the domain specific keywords, and wherein the one or more domain specific keywords of each collection are assigned respective probabilities of being associated with the collection.

3. The method of claim 1 wherein the identifying the domain specific keywords comprises splitting source code identifiers in the software source code.

4. The method of claim 1 wherein the identifying the domain specific keywords comprises:
  extracting source code identifiers from the software source code;
  splitting the source code identifiers to produce a set of potential domain specific keywords; and
  filtering the set of potential domain specific keywords by removing potential domain specific keywords unlikely to indicate topics, wherein the domain specific keywords are those potential domain specific keywords remaining after the filtering.

5. The method of claim 4 wherein the identifying the domain specific keywords further comprises:
  stemming the set of potential domain specific keywords.

6. The method of claim 1 wherein each of the domain specific keywords of the keyword matrix is weighted based upon a location type of the domain specific keyword.

7. The method of claim 1 wherein the software source code is in one or more software source code files, and wherein the keyword matrix is a file-keyword matrix comprising weighted sums of occurrences of the domain specific keywords in the one or more software source code files.

8. The method of claim 7, further comprising:
  outputting, from the processing, an indication of which of the collections are present in specific files of the one or more software source code files.

9. The method of claim 1 wherein the weighted sums in the keyword matrix take into account only cohesion data in the software source code.

10. The method of claim 1 wherein the collections of domain specific keywords and probabilities are output in the form of a topic-keyword matrix whose entries correspond to probabilistic associations between the topics and the domain specific keywords.

11. The method of claim 1 wherein the processing using LDA uses Gibbs sampling.

12. One or more computer-readable media comprising computer-executable instructions for causing a computing device to perform a method for identifying topics in source code using Latent Dirichlet Allocation (LDA), the method comprising:
  receiving one or more software source code files;
  identifying domain specific keywords from the one or more software source code files;
  generating a file-keyword matrix, wherein the file-keyword matrix comprises weighted sums of occurrences of the domain specific keywords in the one or more software source code files;
  processing, using LDA, the file-keyword matrix and the one or more software source code files; and
  outputting, from the processing, collections of domain specific keywords and probabilities, wherein the collections corresponds to respective topics identified by LDA in the one or more software source code files.

13. The one or more computer-readable media of claim 12 wherein each collection comprises one or more of the domain specific keywords, and wherein the one or more domain specific keywords of each collection are assigned respective probabilities of being associated with the collection.

14. The one or more computer-readable media of claim 12 wherein the identifying the domain specific keywords comprises:
  extracting source code identifiers from the one or more software source code files;
  splitting the source code identifiers to produce a set of potential domain specific keywords;
  stemming the set of potential domain specific keywords; and
  filtering the set of potential domain specific keywords by removing those potential domain specific keywords unlikely to indicate topics, wherein the domain specific keywords are those potential domain specific keywords remaining after the filtering.

15. The one or more computer-readable media of claim 12 wherein each of the domain specific keywords of the file-keyword matrix is weighted based upon a location type of the domain specific keyword.

16. The one or more computer-readable media of claim 12, further comprising:
  outputting, from the processing, an indication of which of the collections are present in specific files of the one or more software source code files.

17. The one or more computer-readable media of claim 12 wherein the domain specific keywords come only from cohesion data in the one or more software source code files.

18. A method, implemented at least in part by a computing device, for identifying topics in source code using Latent Dirichlet Allocation (LDA), the method comprising:
  receiving a software source code file;
  identifying a domain specific keyword from the software source code file, wherein the identifying the domain specific keywords comprises splitting a source code identifier from the software source code file;
  generating a file-keyword matrix, wherein the file-keyword matrix comprises a weighted sum of occurrence of the identified domain specific keyword in the software source code file, and wherein the file-keyword matrix is weighted based upon a location type of the identified domain specific keyword;
  receiving, as input to LDA, a plurality of user-defined parameters, wherein the plurality of user-defined parameters comprise a number of topics T, a document Dirichlet parameter $\alpha$, and a topic Dirichlet parameter $\beta$;
  processing, using LDA, the file-keyword matrix and the software source code file; and
  outputting, from the processing, a collection of domain specific keywords, wherein the collection comprises the identified domain specific keyword and a probability of the domain specific keyword being associated with the collection, and wherein the collection corresponds to a topic identified by LDA in the software source code file.

19. The method of claim 18 wherein the identifying the domain specific keyword comprises:
  extracting source code identifiers from the software source code file;
  splitting the source code identifiers to produce a set of potential domain specific keywords; and
  filtering the set of potential domain specific keywords by removing those potential domain specific keywords unlikely to indicate topics, wherein the identified domain specific keyword is one of the domain specific keywords remaining after the filtering.

20. The method of claim 18, further comprising:
  receiving a configuration file comprising a plurality of user-defined parameters used as input to the processing, wherein the plurality of user-defined parameters comprise a desired number of topics.

* * * * *